United States Patent
DeBlock et al.

(10) Patent No.: US 8,362,661 B2
(45) Date of Patent: Jan. 29, 2013

(54) VENTILATED ROTOR AND STATOR FOR DYNAMOELECTRIC MACHINE

(75) Inventors: Mark John DeBlock, Peterborough (CA); Blake Weldon Wilson, Glenville, NY (US); Thomas Mancuso, Niskayuna, NY (US); Lakshminarayana Kanakamedala, Glenville, NY (US)

(73) Assignee: General Electric Company, Schenectady, NY (US)

( * ) Notice: Subject to any disclaimer, the term of this patent is extended or adjusted under 35 U.S.C. 154(b) by 121 days.

(21) Appl. No.: 12/898,795

(22) Filed: Oct. 6, 2010

(65) Prior Publication Data

US 2012/0086291 A1  Apr. 12, 2012

(51) Int. Cl.
*H02K 9/00* (2006.01)
(52) U.S. Cl. .................. 310/59; 310/52; 310/61; 310/62
(58) Field of Classification Search .................. 310/52, 310/54, 58, 59, 61–63; *H02K 9/00, 9/02, H02K 3/22, 3/24*
See application file for complete search history.

(56) References Cited

U.S. PATENT DOCUMENTS

| | | | | |
|---|---|---|---|---|
| 532,795 | A * | 1/1895 | Lemp | 310/265 |
| 890,577 | A * | 6/1908 | Richards | 310/65 |
| 3,675,056 | A * | 7/1972 | Lenz | 310/54 |
| 3,684,906 | A * | 8/1972 | Lenz | 310/61 |
| 3,784,851 | A | 1/1974 | Fujii | |
| 4,152,610 | A * | 5/1979 | Wallenstein | 310/59 |
| 4,301,386 | A | 11/1981 | Schweder et al. | |
| 4,331,895 | A * | 5/1982 | Edick et al. | 310/61 |
| 4,341,966 | A * | 7/1982 | Pangburn | 310/61 |
| 4,365,178 | A | 12/1982 | Lenz | |
| 4,499,660 | A | 2/1985 | Lenz | |
| 5,859,483 | A | 1/1999 | Kliman et al. | |
| 6,268,668 | B1 * | 7/2001 | Jarczynski et al. | 310/52 |
| 6,534,891 | B2 | 3/2003 | Kliman et al. | |
| 6,867,527 | B2 | 3/2005 | Moore | |
| 7,692,352 | B2 | 4/2010 | Sirois | |

(Continued)

FOREIGN PATENT DOCUMENTS

| | | |
|---|---|---|
| DE | 3504782 A1 | 8/1986 |
| EP | 1 926 196 A2 | 5/2008 |
| JP | 2007020337 A * | 1/2007 |
| WO | 2008/059852 A1 | 5/2008 |
| WO | 2009/045958 A1 | 4/2009 |

OTHER PUBLICATIONS

Machine Translation JP 2007020337 A, Aug. 14, 2012.*

(Continued)

*Primary Examiner* — Tran N. Nguyen
*Assistant Examiner* — Thomas Truong
(74) *Attorney, Agent, or Firm* — James W. Pemrick; Ernest G. Cusick; Frank A. Landgraff

(57) ABSTRACT

A laminated rotor and stator are provided for a dynamoelectric machine. The rotor includes at least one end flange having a plurality of cooling apertures and at least one rotor inner vent lamination having a plurality of cooling apertures. At least one rotor outer vent lamination has a plurality of cooling apertures in communication with a first plurality of radially oriented ventilating slots. The end flange, rotor inner vent lamination and rotor outer vent lamination are configured together into a rotor lamination stack, and the plurality of cooling apertures form a generally axial cooling passage for a flow of a cooling medium.

18 Claims, 14 Drawing Sheets

U.S. PATENT DOCUMENTS

| | | |
|---|---|---|
| 7,772,738 B2 | 8/2010 | Huppunen et al. |
| 2002/0005671 A1 | 1/2002 | Welke et al. |
| 2008/0129129 A1* | 6/2008 | Kori et al. ............ 310/58 |
| 2009/0058204 A1* | 3/2009 | Sirois ............ 310/59 |
| 2009/0261669 A1* | 10/2009 | Sirois ............ 310/59 |

OTHER PUBLICATIONS

Search Report and Written Opinion from corresponding GB Application No. GB1117005.7 dated Feb. 2, 2012.

* cited by examiner

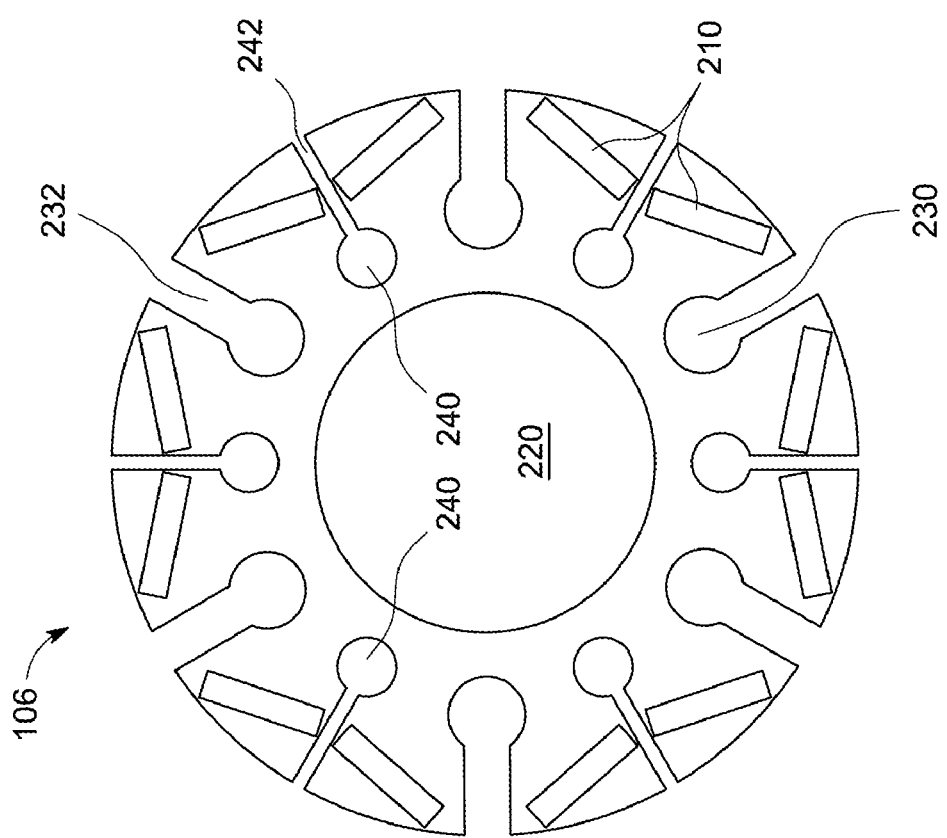

VENTILATED ROTOR AND STATOR FOR DYNAMOELECTRIC MACHINE

BACKGROUND OF THE INVENTION

The subject matter described herein relates generally to dynamoelectric machines and more particularly to a dynamoelectric machine having a laminated rotor and stator with ventilation passageways.

Presently, a known method of cooling a dynamoelectric machine includes ventilating a rotor and/or a stator core using spacers. In general, a core may comprise laminations and the spacers may be mounted at discrete intervals to separate lamination packets. The spacers may be configured as I-beams, blocks or packets where the I-beams and the blocks simply function to space the laminations and allow for the flow of cooling air between the laminations. Spacer packets may include a central bore that communicates with an aperture of each lamination that it is disposed between and thus may provide for a flow of cooling air transversely through the laminations. One disadvantage to the above methods is that each requires fixing of the spacers between laminations thereby substantially increasing complexity and fabrication costs.

BRIEF SUMMARY OF THE INVENTION

According to one aspect of the present invention, a laminated rotor is provided for a dynamoelectric machine. The rotor includes at least one end flange having a plurality of cooling apertures and at least one rotor inner vent lamination having a plurality of cooling apertures. At least one rotor outer vent lamination has a plurality of cooling apertures in communication with a first plurality of radially oriented ventilating slots. The end flange, rotor inner vent lamination and rotor outer vent lamination are configured together into a rotor lamination stack, and the plurality of cooling apertures form a generally axial cooling passage for a flow of a cooling medium.

According to another aspect of the present invention, a laminated stator is provided for a dynamoelectric machine. The stator includes at least one end lamination having a plurality of slots for stator windings, and at least one first lamination having a first plurality of slots in communication with a first plurality of cooling apertures. The stator windings are contained within the first plurality of slots. At least one second lamination has a second plurality of slots and a second plurality of cooling apertures in communication with the first plurality of cooling apertures. The stator windings are also contained within the second plurality of slots. The end lamination, first lamination and second lamination are configured together into a stator lamination stack. The plurality of slots form a generally radial cooling passage and the first and second plurality of cooling apertures form a generally axial cooling passage for a flow of a cooling medium.

According to a still further aspect of the present invention, a dynamoelectric machine is provided having a rotor and a stator. The dynamoelectric machine includes at least one rotor end flange having a plurality of rotor cooling apertures, at least one rotor inner vent lamination having a plurality of rotor cooling apertures, and at least one rotor outer vent lamination having a plurality of rotor cooling apertures in communication with a first plurality of rotor radially oriented ventilating slots. The stator includes at least one stator end lamination having a plurality of slots for stator windings, at least one stator first lamination having a first plurality of slots in communication with a first plurality of stator cooling apertures, where the stator windings are contained within the first plurality of slots. At least one stator second lamination includes a second plurality of slots and a second plurality of stator cooling apertures in communication with the first plurality of stator cooling apertures, where the stator windings contained within the second plurality of slots. The rotor end flange rotor inner vent lamination and rotor outer vent lamination are configured together into a rotor lamination stack, and the plurality of rotor cooling apertures form a generally axial rotor cooling passage for a flow of a cooling medium. The stator end lamination, stator first lamination and the stator second lamination are configured together into a stator lamination stack, and the plurality of slots form a generally radial cooling passage and the first and second plurality of stator cooling apertures form a generally axial stator cooling passage for a flow of the cooling medium.

BRIEF DESCRIPTION OF THE DRAWINGS

FIG. 4 illustrates a cross-sectional view of a rotor outer vent lamination, according to an aspect of the present invention;

DETAILED DESCRIPTION OF THE INVENTION

One aspect of the present invention concerns a device for cooling a dynamoelectric machine that comprises a laminated core of non-spaced laminations that are dimensioned and configured to provide for both a laminar flow and/or a turbulent flow of cooling fluid through the laminations. In this way, fabrication costs are substantially reduced by the omission of fixing spacers between laminations. A dynamoelectric machine may include generators, motors or any device that converts mechanical energy to or from electrical energy.

Figure 1:
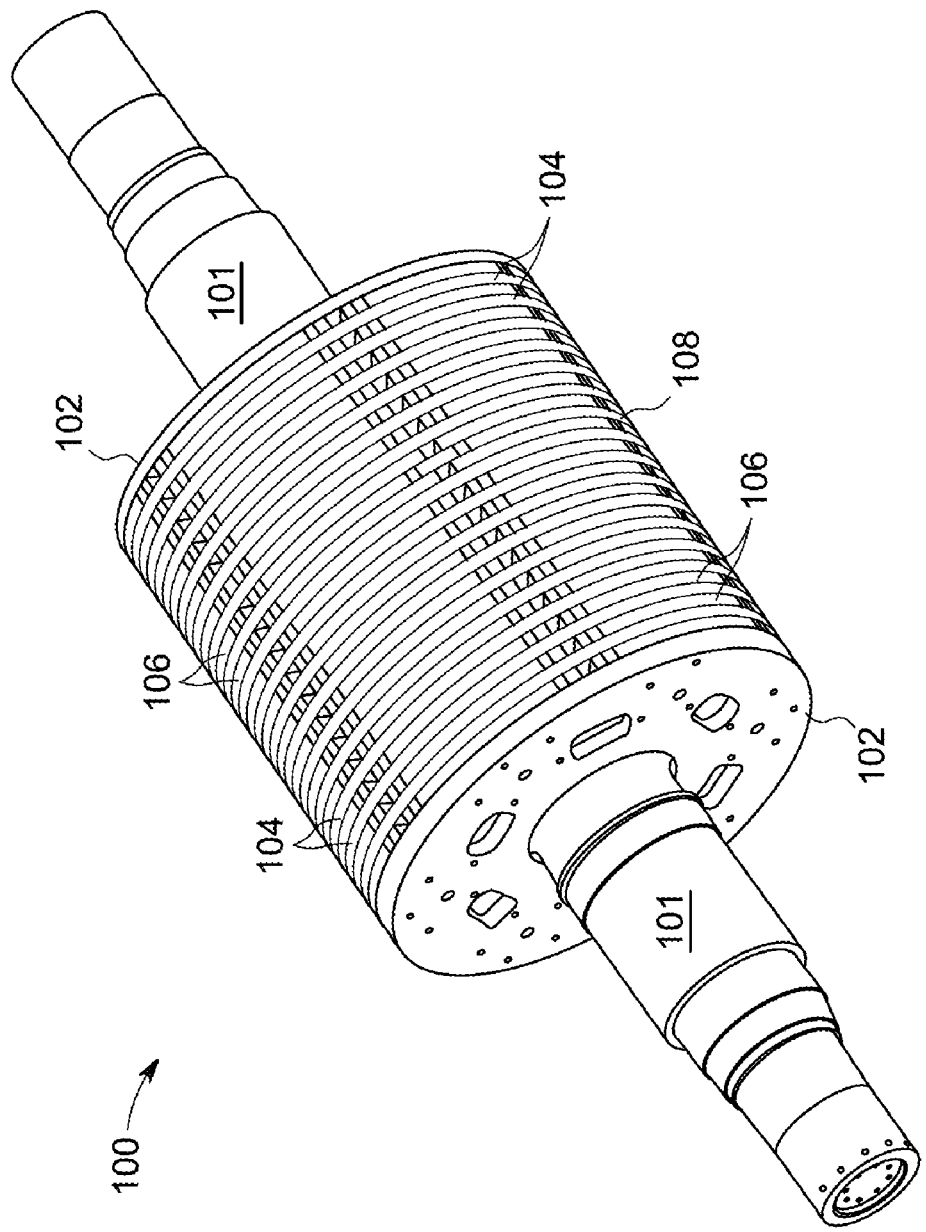
FIG. 1 illustrates a perspective view of a rotor, according to an aspect of the present invention.

Referring now to FIG. 1, a laminated rotor in accordance with an aspect of the present invention is illustrated generally at 100. In this embodiment, the laminated rotor 100 comprises one or more end flanges 102, a plurality of rotor inner vent laminations 104, a plurality of rotor outer vent laminations 106 and a rotor center lamination 108. As shown each of end flanges 102, rotor inner vent laminations 104, rotor outer vent laminations 106 and rotor center lamination 108 are disposed adjacent each other without any spacers that provide for the flow of a cooling fluid therebetween. Of course groups of laminations may be adhered together and/or encapsulated in a manner that is generally not porous to the flow of a cooling fluid, except for the regions defined by the axial and radial cooling passages. Accordingly, the terms spacer and non-spaced relation, as used herein, shall not refer to an adhered or encapsulated condition of the laminated core 100. Also it will be appreciated that each of the end flanges 102, rotor inner vent laminations 104, rotor outer vent laminations 106 and rotor center lamination 108 may each comprise a generally disc-like outer configuration and as such each has a relatively small width relative to an outer diameter thereof. Further, one or more of the end flanges 102, rotor inner vent laminations 104, rotor outer vent laminations 106 and rotor center lamination 108 may comprise a ferromagnetic material that may be stamped and/or cut using various cutting mediums such as a laser beam or high pressure water.

Figure 3:
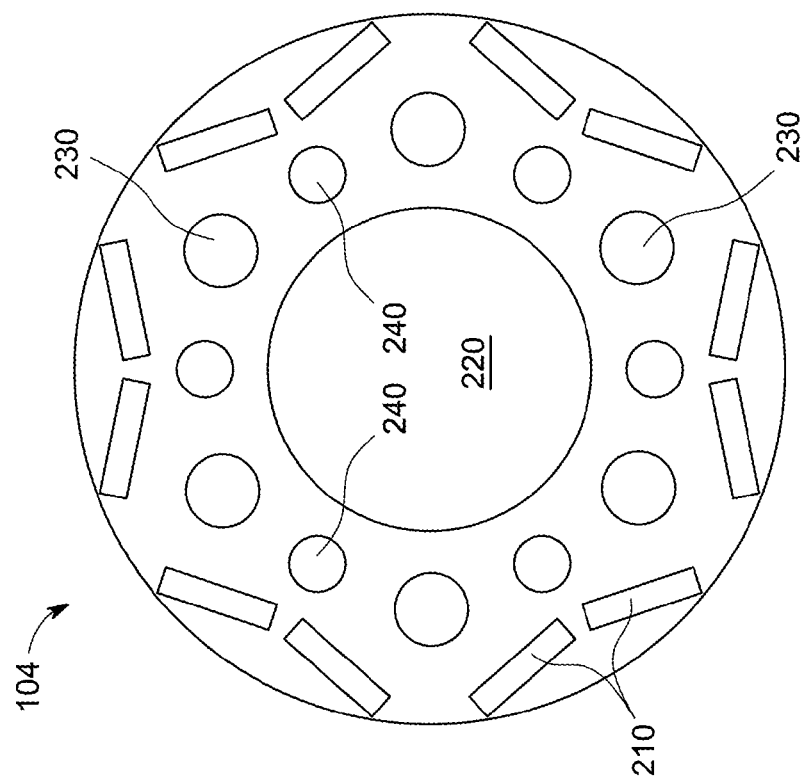
FIG. 3 illustrates a cross-sectional view of a rotor inner vent lamination, according to an aspect of the present invention.
Figure 2:
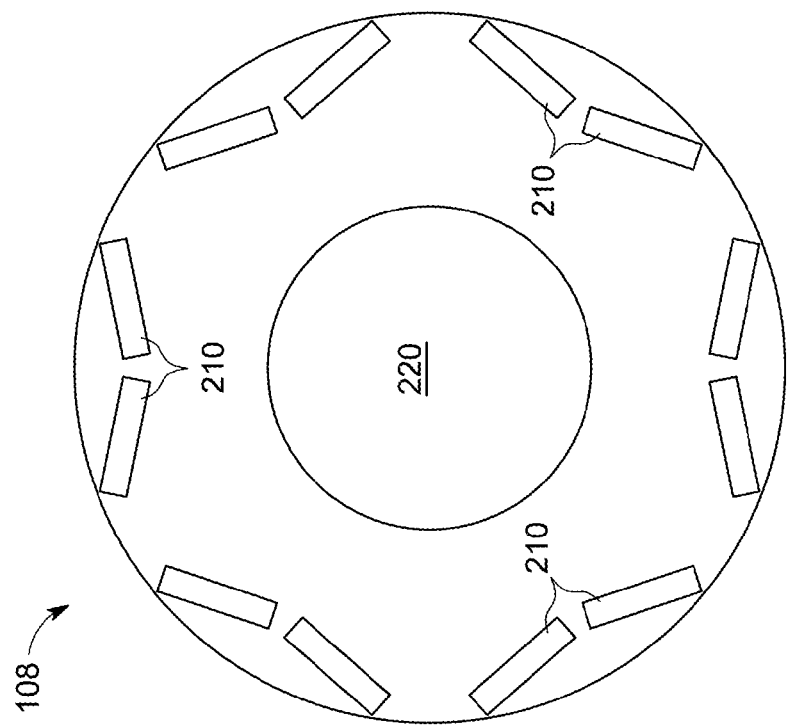
FIG. 2 illustrates a cross-sectional view of a rotor center lamination, according to an aspect of the present invention.

Referring now to FIGS. 2-4, each rotor inner vent lamination 104, rotor outer vent lamination 106 and rotor center lamination 108 comprises a plurality of apertures 210 which generally contain a conductive material such as copper or aluminum (not shown) or a permanent magnet. As shown, each end flange 102, rotor inner vent lamination 104, rotor outer vent lamination 106 and rotor center lamination 108 may comprise a central aperture 220 for mounting to a generator or motor shaft (not shown). Although not shown, the laminations may be configured to include a key way that engages a key on the rotor shaft 101. A first plurality of axial cooling apertures 230 are provided for cooling purposes and are spaced circumferentially and radially from the central aperture 220. A second plurality of axial cooling apertures 240 may be provided for cooling purposes and are spaced circumferentially and radially from the central aperture 220. The end flanges 102 may also include cooling apertures 230 and 240. A fan (not shown) may be employed to create a laminar and/or turbulent flow of cooling fluid that passes through the apertures 230 and 240 in a generally parallel direction to a rotational axis (i.e., the axial axis). However, the rotor can be configured to provide pressure and flow characteristics suitable to cool the dynamoelectric machine. Thereby reducing or eliminating the need for external or shaft mounted fans.

In some applications, the center lamination 108 has no ventilation holes or slots, and a double end ventilated machine is shown in FIG. 1. However, it is to be understood that the center lamination 108 could be moved to either of the end lamination 102 locations in a single end ventilated machine. In this instance, one of the end laminations would be removed and replaced with the center lamination. In all applications, the end laminations may include apertures 210. The center lamination 108 may include radial and/or axial ventilation slots as desired in specific applications.

Figure 5:
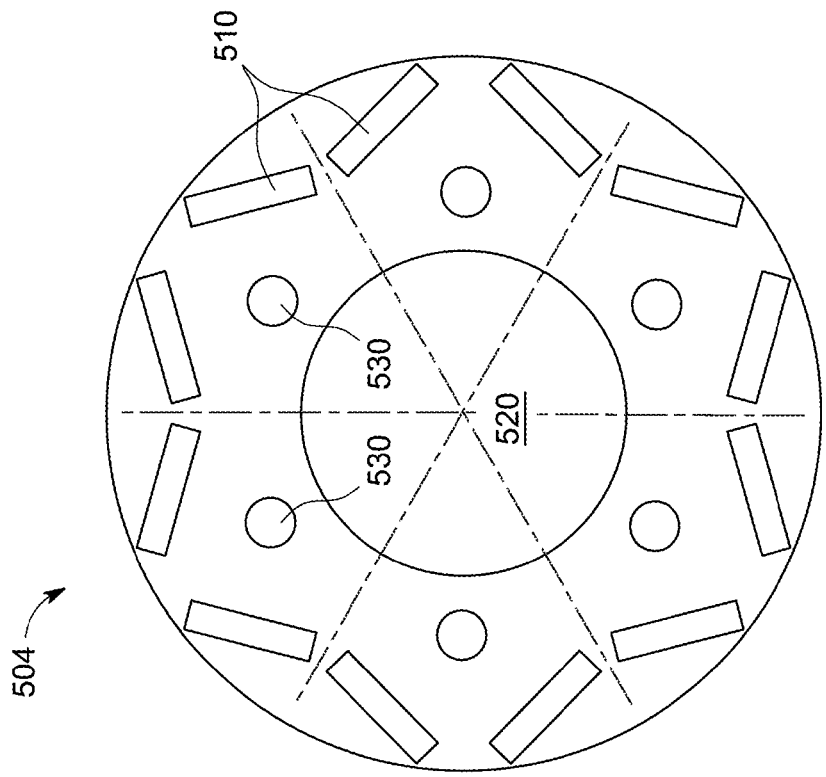
FIG. 5 illustrates a cross-sectional view of a rotor inner vent lamination, according to an aspect of the present invention.

In FIG. 4, the rotor outer vent laminations 106 also include radial ventilation slots connected to the cooling apertures. The cooling apertures 230 are connected to and communicate with radial ventilation slots 232, and the cooling apertures 240 are connected to and communicate with radial ventilation slots 242. The ventilation slots 232 and 242 extend radially outward from the cooling apertures 230, 240, respectively. As shown, the ventilation slots 242 can extend approximately through the pole centerline, while the ventilation slots 232 extend approximately between the pole centerlines. FIG. 5 illustrates the pole centerlines by the dotted lines passing between the winding apertures 510, as each dotted line is a pole centerline. When all the laminations are stacked together, the cooling apertures 230 and 240 form generally axial cooling passages, while the ventilation slots form generally radial cooling slots or passages.

It will be appreciated that while the cooling apertures are shown having a circular cross-section and the ventilation slots are shown as having generally rectangular cross-section, as viewed from an axial direction onto a radial plane, any suitable geometrical configuration that provides suitable structural support and fluid flow, for the cooling apertures and ventilation slots, may be employed. In addition, it will be understood that any suitable number of cooling apertures and ventilation slots may be employed in the practice of the invention.

FIG. 5 illustrates an end view of an alternate rotor inner vent lamination 504. Lamination 504 includes axial cooling apertures 530, winding apertures 510 and central aperture 520. Winding apertures 510 generally contain a permanent magnet, or a conductive material such as copper or aluminum (not shown). Central aperture 520 is used for mounting to a generator or motor shaft (not shown). The cooling apertures 530 are provided for cooling purposes and are spaced circumferentially and radially from the central aperture 520.

Figure 6:
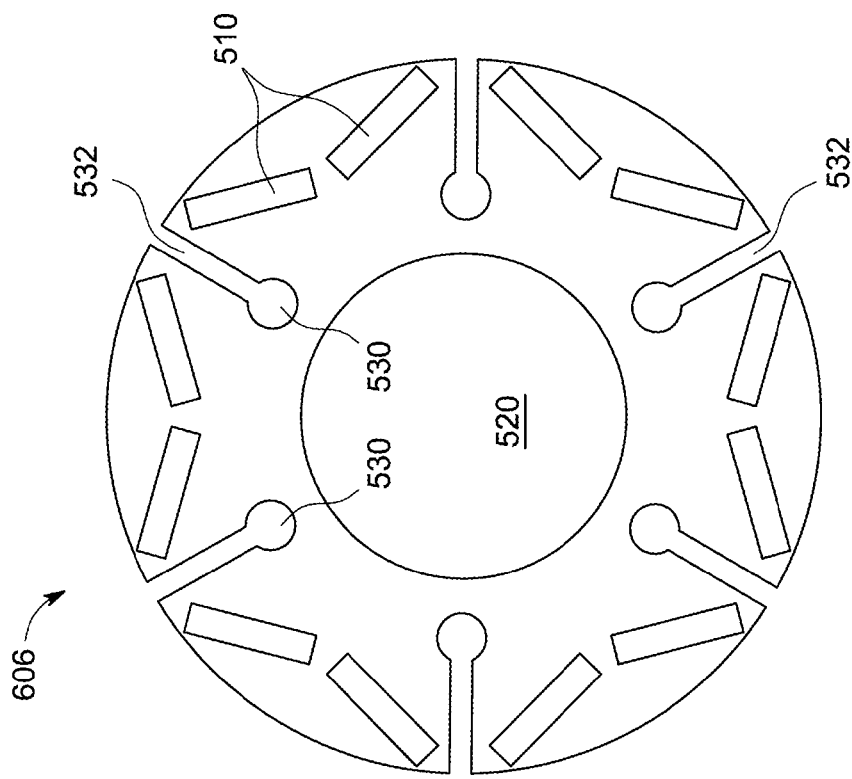
FIG. 6 illustrates a cross-sectional view of a rotor outer vent lamination, according to an aspect of the present invention.

FIG. 6 illustrates an end view of an alternate rotor outer vent lamination 606. Lamination 606 includes axial cooling apertures 530, radial ventilation slots 532, winding apertures 510 and central aperture 520. The cooling apertures 530 are provided for cooling purposes and are spaced circumferentially and radially from the central aperture 520. The cooling apertures 530 are connected to and communicate with radial ventilation slots 532. The ventilation slots 532 extend radially outward from the cooling apertures 530, and extend approximately between the pole centerlines. When all the laminations are stacked together, the cooling apertures 530 form generally axial cooling passages, while the ventilation slots 532 form generally radial cooling slots or passages.

The laminations 504 and 606 can be used together with the center lamination 108, which may have no ventilation holes or slots and the end laminations 102. In a double ended ventilated machine the center lamination 108 would be located generally in the middle of the lamination stack However, it is to be understood that the center lamination 108 could be moved to either of the end lamination 102 locations in a single end ventilated machine. In this instance, one of the end laminations would be removed and replaced with the center lamination. In all applications, the end laminations may include apertures 210, 510.

Figure 7:
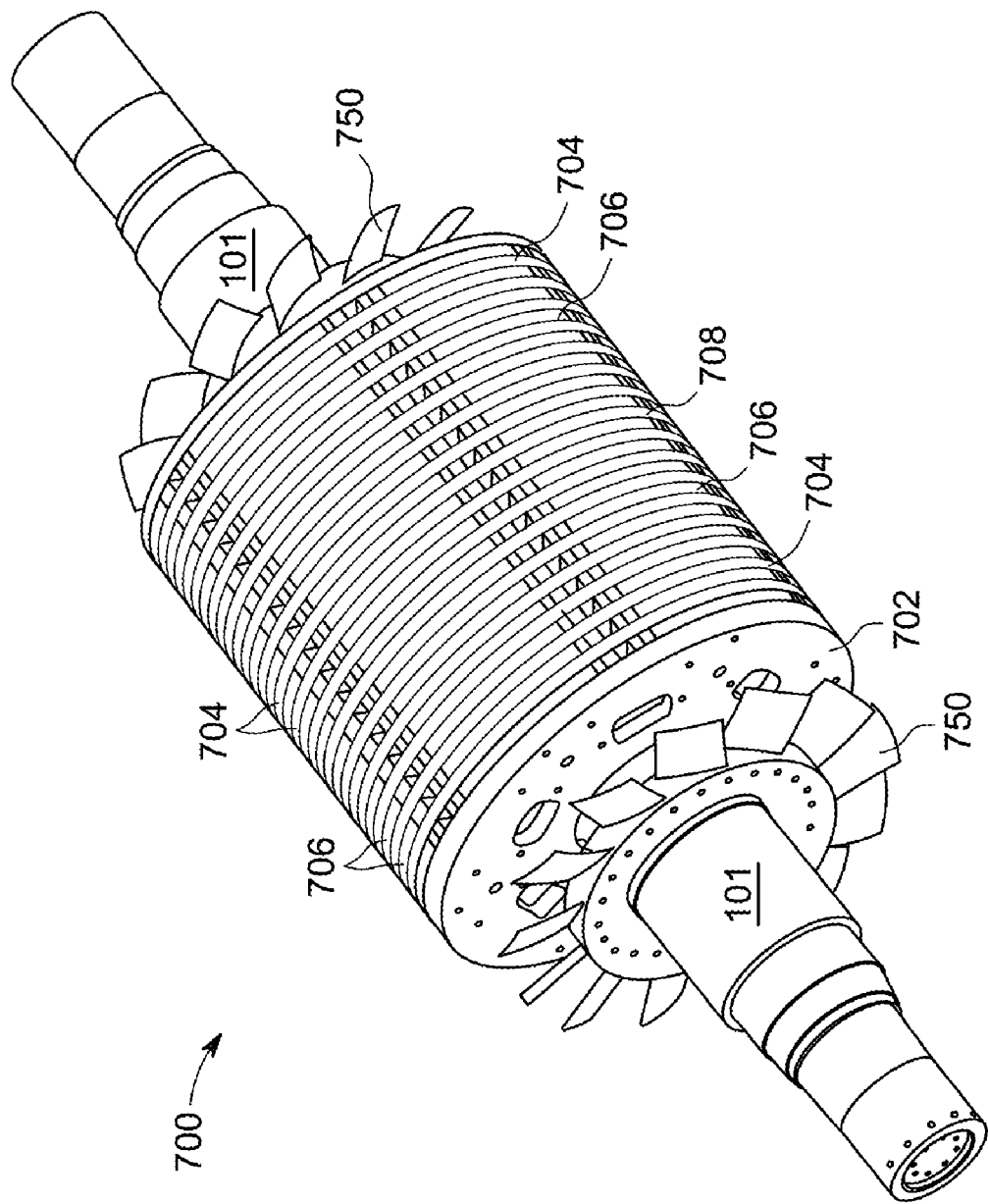
FIG. 7 illustrates a perspective view of a rotor, according to an aspect of the present invention.

FIG. 7 illustrates a perspective view of a laminated rotor 700 in accordance with an aspect of the present invention. The laminated rotor 700 comprises one or more end flanges 702, a plurality of rotor inner vent laminations 704, a plurality of rotor outer vent laminations 706 and a rotor center lamination 708. The configuration of the end flanges 702, rotor inner vent laminations 704, rotor outer vent laminations 706 and center lamination 708 can be similar to the end flanges 102, rotor inner vent laminations 104, rotor outer vent laminations 106 and center lamination 108, respectively. However, rotor center lamination 708 may include radial slots 232, 242 and/or axial ventilation passages 230, 240, as may be desired in some applications.

As shown each of end flanges 702, rotor inner vent laminations 704, rotor outer vent laminations 706 and rotor center lamination 708 are disposed adjacent each other without any spacers that provide for the flow of a cooling fluid therebetween as provided for in the prior art. One or more axial fans 750 are located on the rotor shaft 101 and direct a cooling medium into the rotor laminations. In a double ended ventilated machine (as shown) the center lamination 708 would be located generally in the middle of the lamination stack. And the fans 750 would be located at both ends of the lamination stack. However, it is to be understood that the center lamination 708 could be moved to either of the end lamination 702 locations in a single end ventilated machine. In this instance, one of the end laminations would be removed and replaced with the center lamination.

Figure 8:
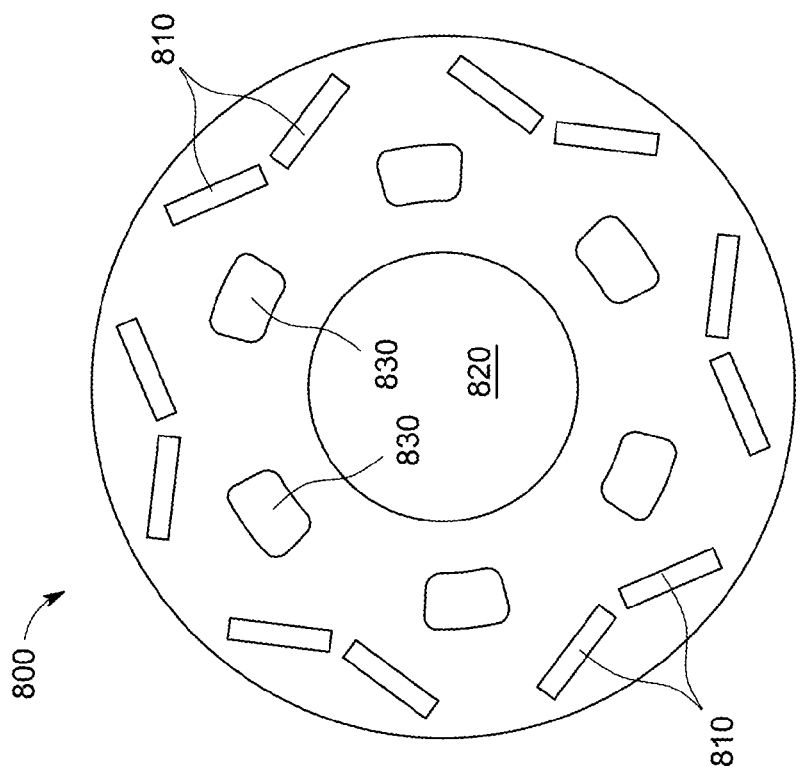
FIG. 8 illustrates a cross-sectional view of a first lamination, according to an aspect of the present invention.

FIGS. 8-11 illustrate a series of laminations that can be used in a dynamoelectric machine, according to an aspect of the present invention. FIG. 8 illustrates a first lamination (or rotor inner vent lamination) 800 having a plurality of apertures 810 which generally contain a permanent magnet or conductive material such as copper or aluminum (not shown). In one aspect the conductive material is used as a rotor winding or field. A central aperture 820 is used for mounting to a generator or motor shaft (not shown). The laminations may be configured to include a keyway 821 that engages a key on the rotor shaft. A first plurality of axial cooling apertures 830 are provided for cooling purposes and are spaced circumferentially and radially from the central aperture 820.

Figure 9:
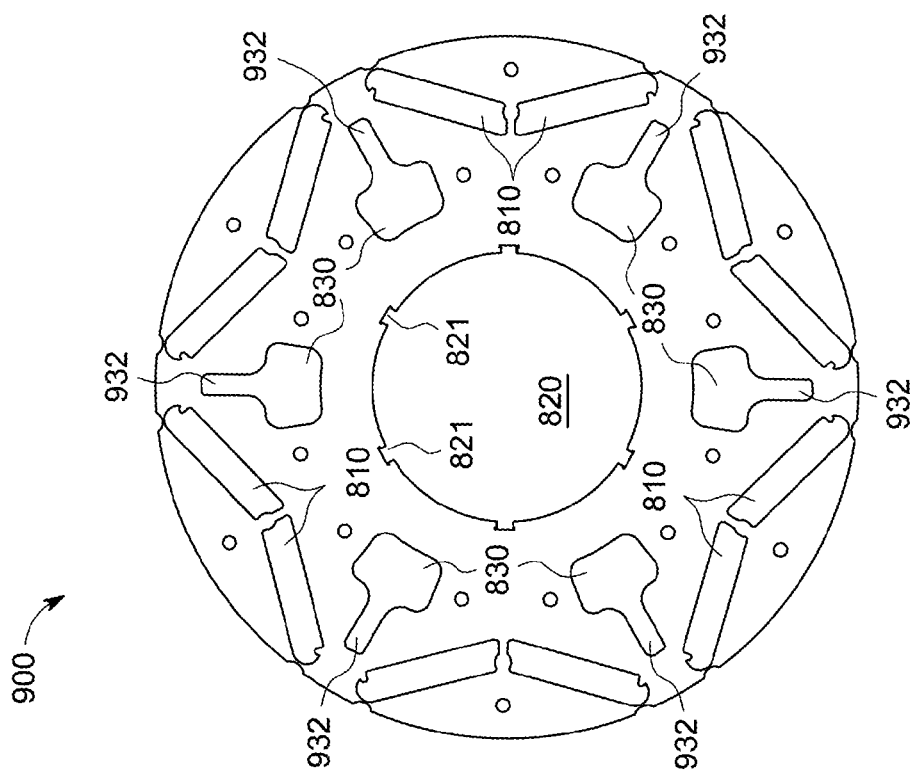
FIG. 9 illustrates a cross-sectional view of a second lamination, according to an aspect of the present invention.
Figure 11:
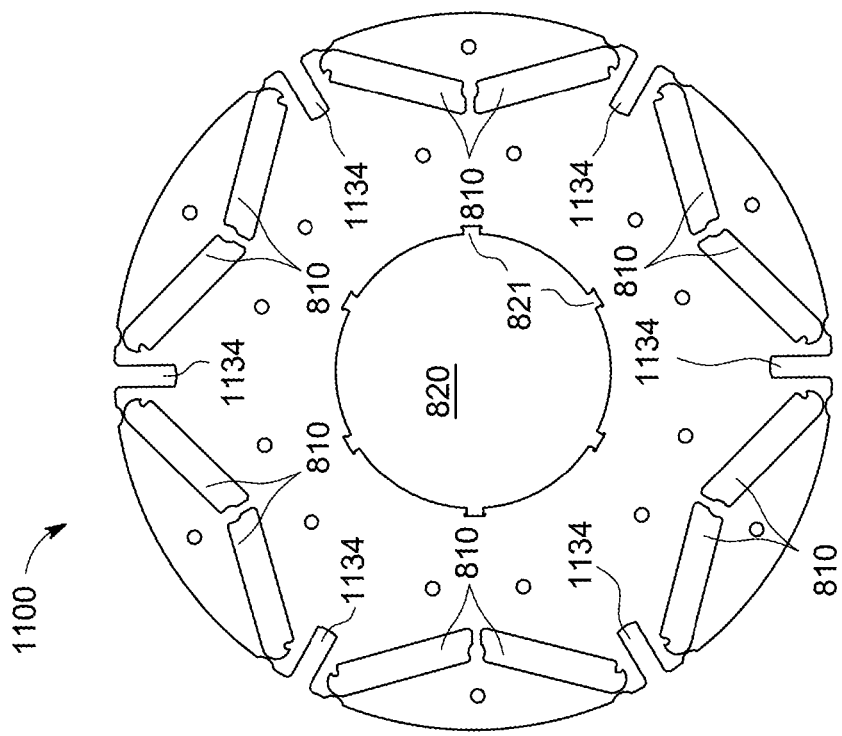
FIG. 11 illustrates a cross-sectional view of a fourth lamination, according to an aspect of the present invention.
Figure 10:
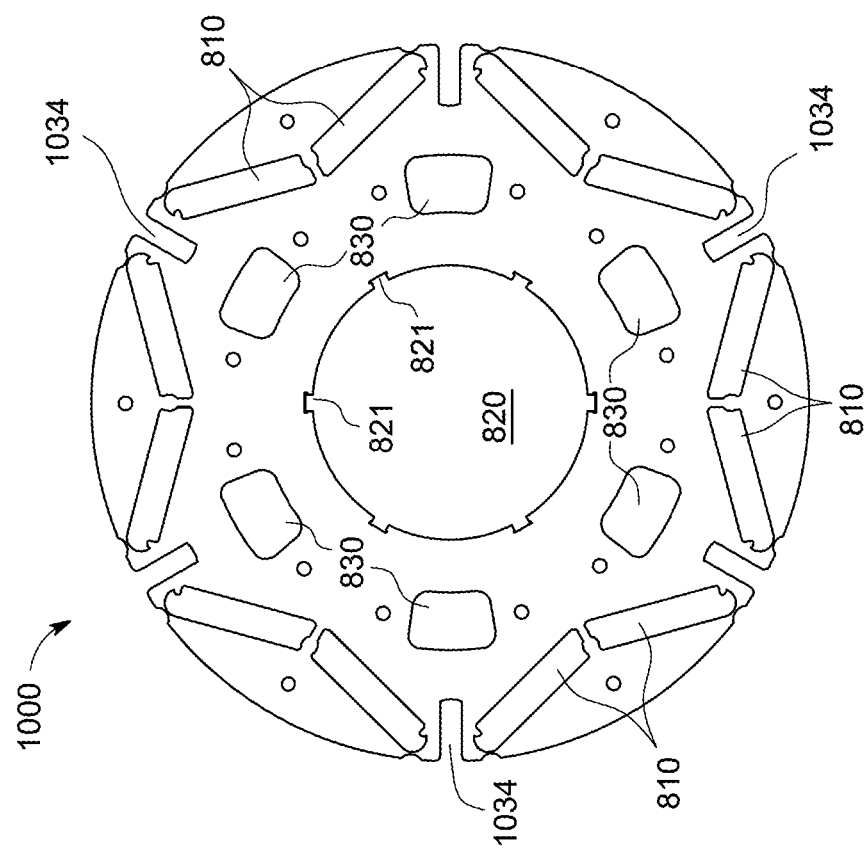
FIG. 10 illustrates a cross-sectional view of a third lamination, according to an aspect of the present invention.

FIG. 9 illustrates a second lamination (or rotor outer vent lamination) 900 that includes radial ventilation slots 932 that are in communication with cooling apertures 830. FIG. 10 illustrates a third lamination 1000 having radial ventilation slots 1034. FIG. 11 illustrates a fourth lamination 1100 having radial ventilation slots 1134, and can be used in the middle of the lamination stack for double ended ventilated machines, or at one end for single-ended machines. The axial cooling apertures 830 form an axial cooling passage, and the ventilation slots 932, 1034 and 1134 form a generally radial cooling passage.

Figure 12:
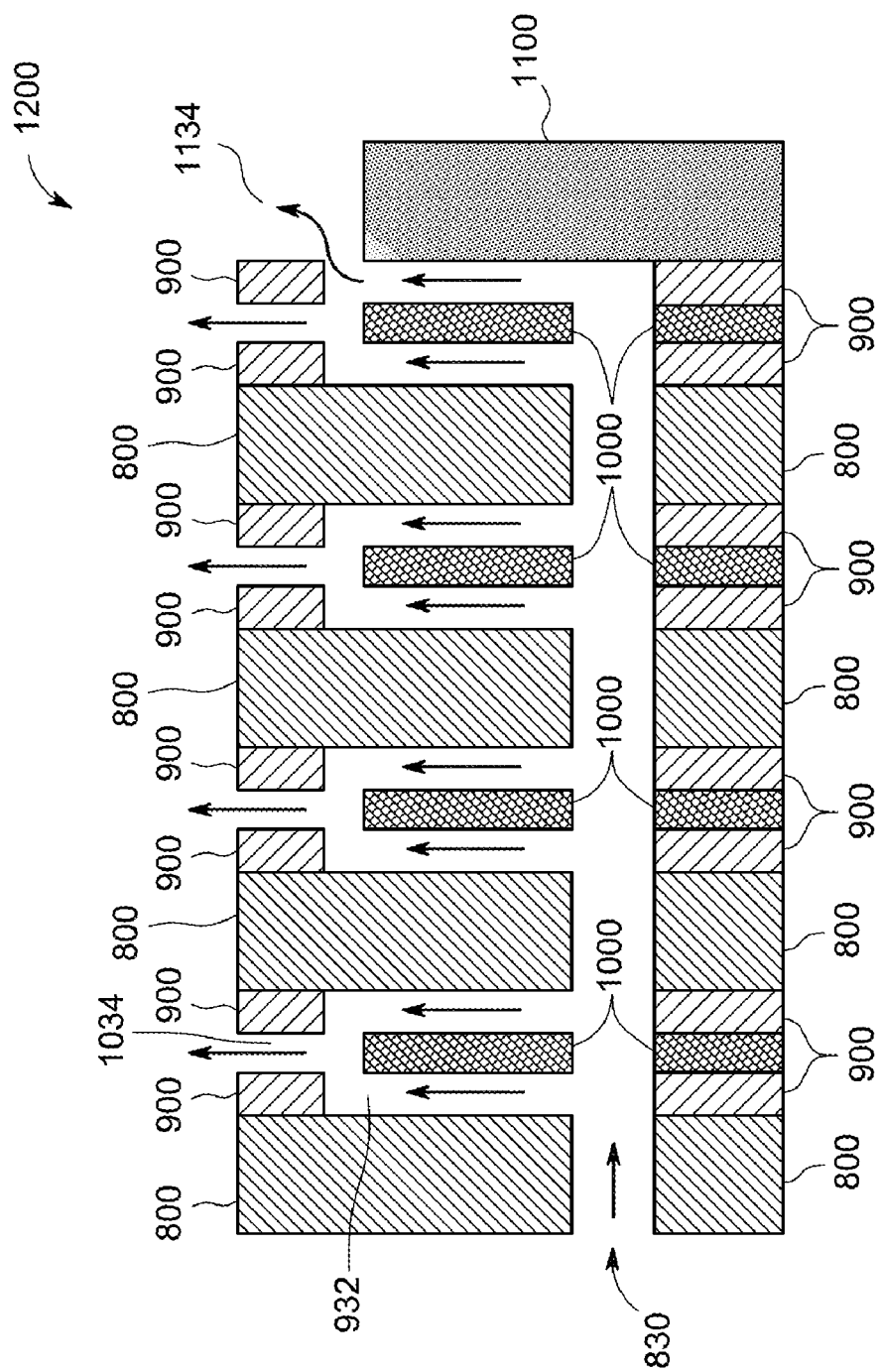
FIG. 12 illustrates a partial cross-sectional view of a rotor, according to an aspect of the present invention.

FIG. 12 illustrates a portion of a rotor or field 1200 of a dynamoelectric machine employing the laminations of FIGS. 8-11. The laminations 800, 900, 1000 and 1100 can be arranged so that a cooling medium (e.g., air or hydrogen, etc.) flows (as generally indicated by the arrows) axially through apertures 830 and then radially up through ventilation slots 932 and 1034. At the junction of slots 932 and 1034 the flow will turn and may become turbulated or flow in both radial and axial directions until exiting the top of slot 1034. The fourth lamination 1100 functions to substantially block the airflow from further axial movement, except in slot 1134 which functions as a radial vent or slot. In a double-ended machine, end flanges 102, 702 may be located at the ends of the lamination stack. FIG. 12 shows about half of the rotor for a double ended machine, with the end flange and windings omitted for clarity, and typically the fourth lamination is located near the center or middle of the lamination stack. In a single-ended machine one end flange may be located at one end, while the fourth lamination may be located at the opposing end. In some applications, lamination 800 can be eliminated and replaced with additional laminations 900 and 1000.

Figure 15:
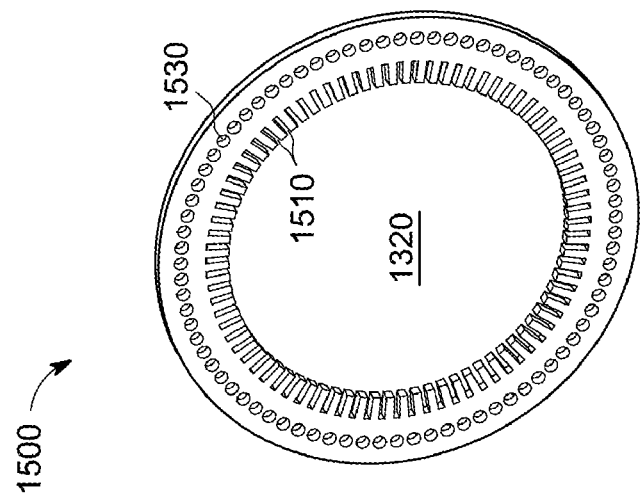
FIG. 15 illustrates a perspective view of a stator second lamination, according to an aspect of the present invention.
Figure 14:
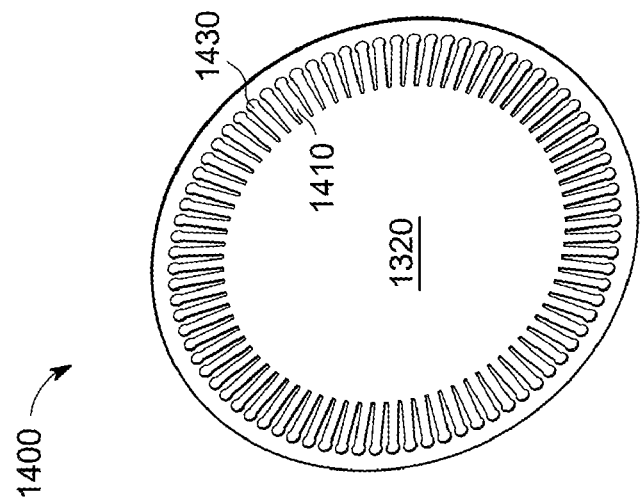
FIG. 14 illustrates a perspective view of a stator first lamination, according to an aspect of the present invention.
Figure 13:
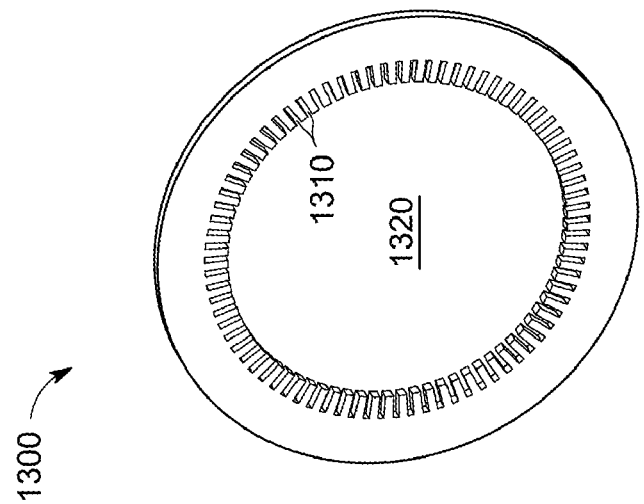
FIG. 13 illustrates a perspective view of a stator end lamination, according to an aspect of the present invention.

A stator for a dynamoelectric machine may also be comprised of multiple laminations. FIG. 13 illustrates a perspective view of an end lamination 1300 for a stator core. The end lamination 1300 includes a plurality of slots 1310 that are configured to contain a conductive material such as copper or aluminum (not shown). Central aperture 1320 is used for mounting over a rotor (not shown). FIG. 14 illustrates a perspective view of a first lamination 1400 that includes slots 1410 and cooling apertures 1430. FIG. 15 illustrates a perspective view of a second lamination 1500 that includes slots 1510 and cooling apertures 1530.

Figure 16:
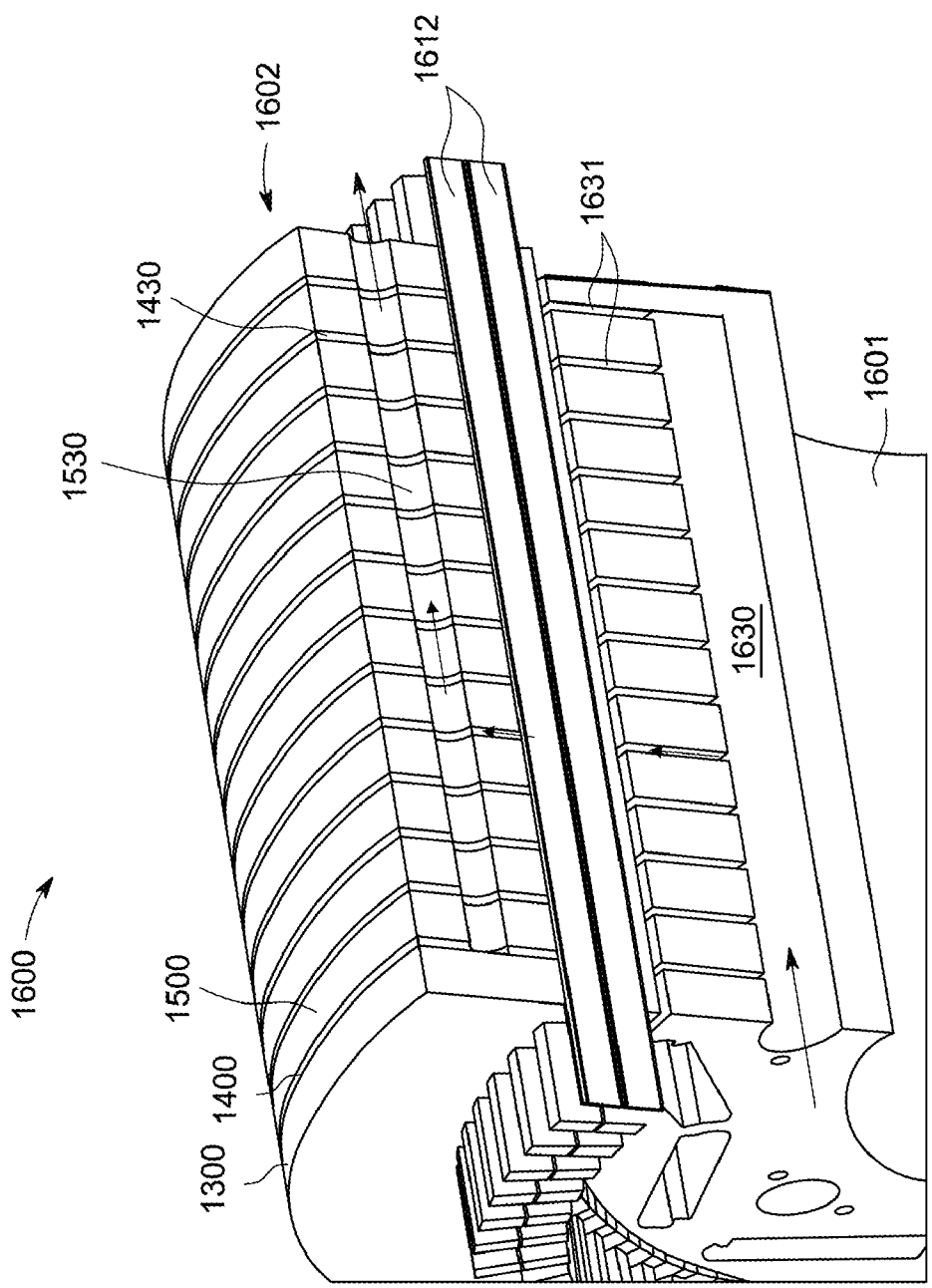
FIG. 16 illustrates a partial, cut-away perspective view of a stator and a rotor, according to an aspect of the present invention.

FIG. 16 illustrates a partial cut-away and perspective view of a dynamoelectric machine 1600 having a rotor 1601 and stator 1602. The stator 1602 is comprised of a stack of one or more end laminations 1300, one or more first laminations 1400 and one or more second laminations 1500. The rotor 1601 includes a plurality of axial cooling passages 1630 which are in communications with a plurality of radial cooling passages 1631. The rotor 1601 may be formed of a stack of multiple laminations as described in connection with FIGS. 1-12.

The slots 1310, 1410 and 1510 in the stator laminations are configured to accept the stator windings 1612. The stator windings 1612 and slots 1310, 1410, 1510 are configured with space therebetween to allow the cooling medium (e.g., air or hydrogen) flowing radially outward from the rotor 1601 to enter the slots 1310, 1410, 1510 and pass over at least a portion of the windings 1612. After the cooling medium passes by the windings 1612, it enters the outer radial portion of slots 1410 and then travels axially along the axial cooling passage formed by cooling apertures 1430 and 1530.

Figure 17:
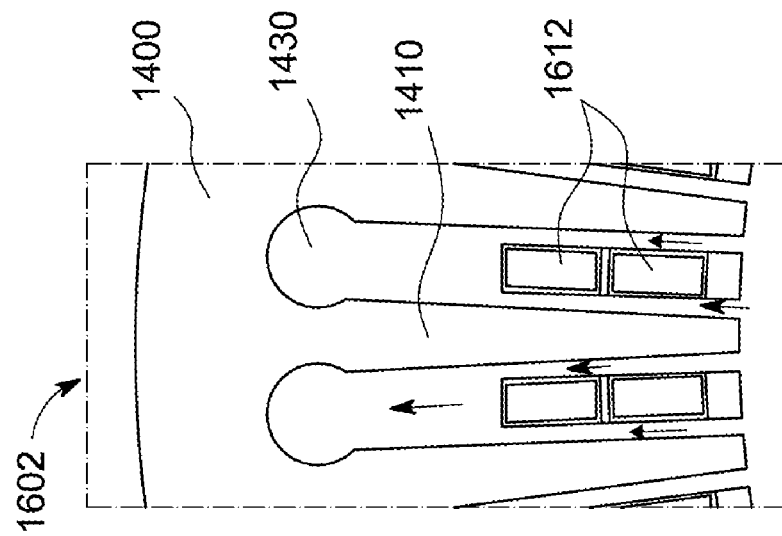
FIG. 17 illustrates a partial cross-sectional view of a stator, according to an aspect of the present invention.

FIG. 17 illustrates a partial cross-sectional view of the stator 1602 of FIG. 16. A portion of the lamination 1400 is shown having the ventilation slot 1410 and cooling aperture 1430. The windings 1612 are disposed within slot 1410, but a space is maintained on either side to allow the cooling medium to pass over the windings 1612. The cooling medium flows radially outward (or vertically up in FIG. 17) and then in or out of the page along the channel formed by apertures 1430 and 1530.

Figure 18:
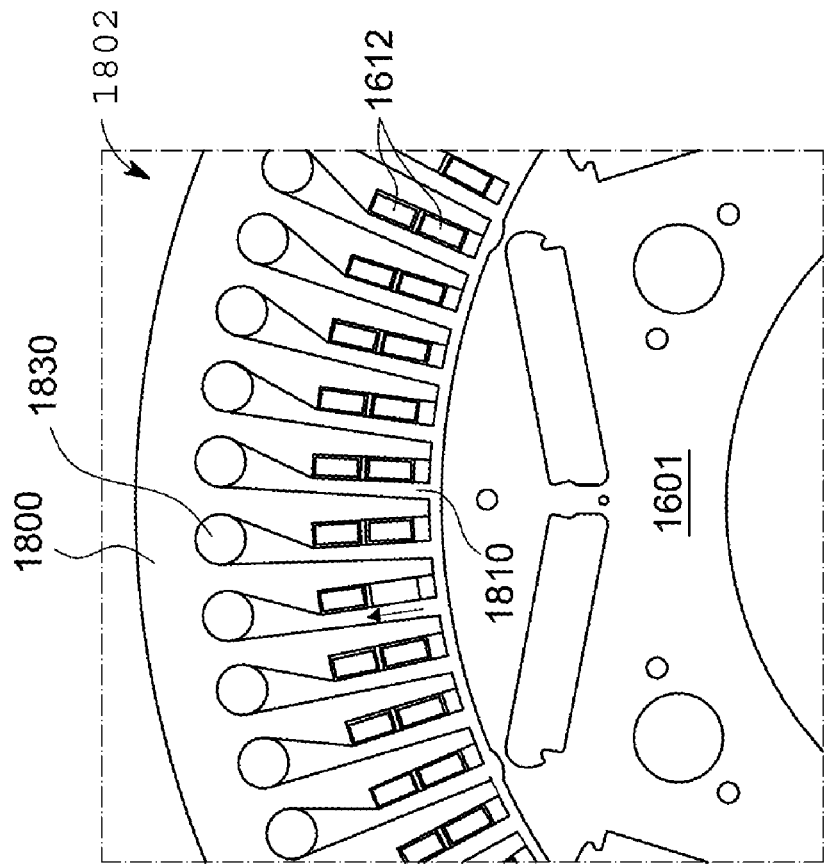
FIG. 18 illustrates a partial cross-sectional view of a stator, according to an aspect of the present invention.

FIG. 18 illustrates a partial cross-sectional view of the stator 1802, according to another aspect of the present invention. The slots in the laminations can be configured to expose only one side of the windings 1612. In this example, first lamination 1800 includes cooling apertures 1830 and ventilation slots 1810. The ventilation slots 1810 extend radially outward along one side of the windings 1612 and then taper out to the cooling apertures 1830. The slots in the other laminations can have a similar configuration. This configuration cools one side of the stator winding or coil, and may reduce expansion at the back of the slot (due to a lower pressure drop).

Figure 19:
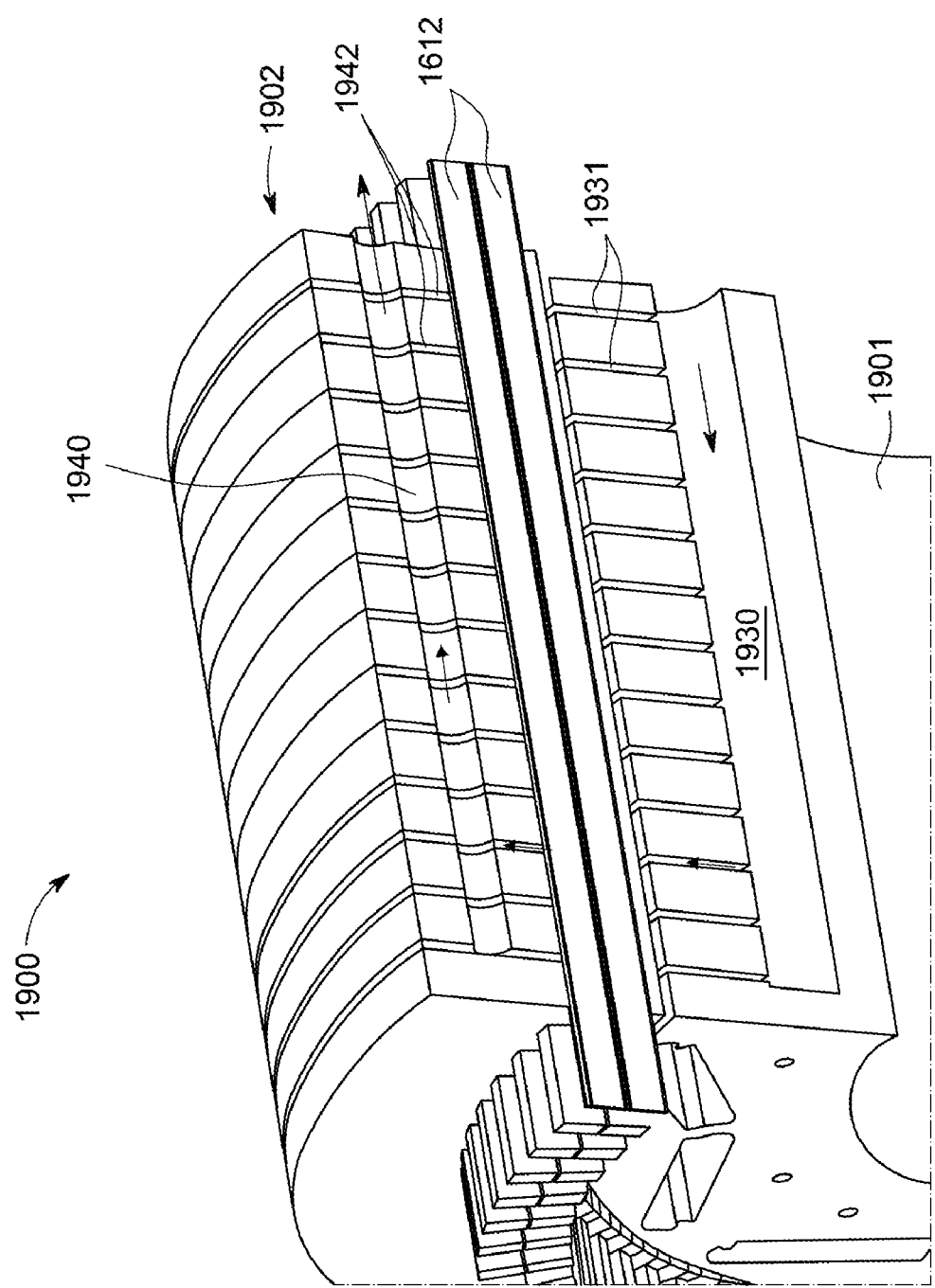
FIG. 19 illustrates a partial, cut-away perspective view of a stator and a rotor, according to an aspect of the present invention.

FIG. 19 illustrates a partial perspective view of a dynamoelectric machine 1900 having rotor 1901 and stator 1902. In this single-ended ventilated machine example, the cooling medium can be applied through rotor axial passage 1930 by a suitable device such as a fan (not shown). The cooling medium passes axially along passage 1930 and radially outward through radial passages 1931. As the cooling medium exits the rotor 1901, it then enters into the radial passages 1942 in stator 1902. The cooling medium then enters axial passage 1940 and travels axially until it exits the stator. The passages are formed by the various apertures and slots within the stack of laminations which comprise the rotor and stator.

Figure 20:
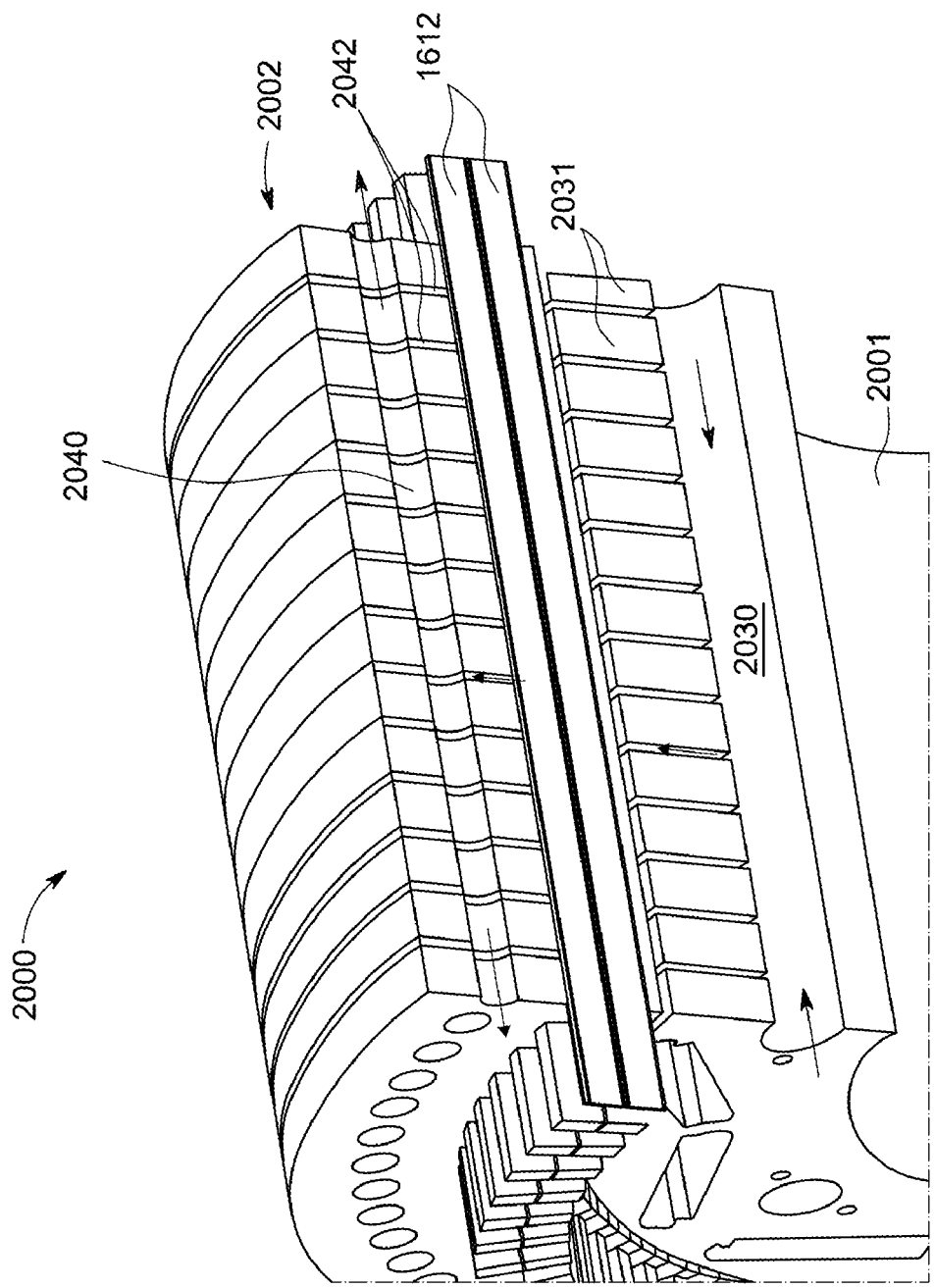
FIG. 20 illustrates a partial, cut-away perspective view of a stator and a rotor, according to an aspect of the present invention.

FIG. 20 illustrates a partial perspective view of a double-end ventilated dynamoelectric machine 2000 having rotor 2001 and stator 2002. In this double-end ventilated machine, the cooling medium can be applied through both ends of rotor axial passage 2030 by a suitable device such as a fan (not shown). The cooling medium passes axially inward along passage 2030 and radially outward through rotor radial passages 2031. As the cooling medium exits the rotor 2001, it then enters into the radial passages 2042 in stator 2002. The cooling medium then enters axial passage 2040 and travels axially towards both ends of the machine until it exits the stator. In this application a lamination (not shown) having no cooling apertures or ventilation slots could be used at the center of the lamination stack.

Figure 21:
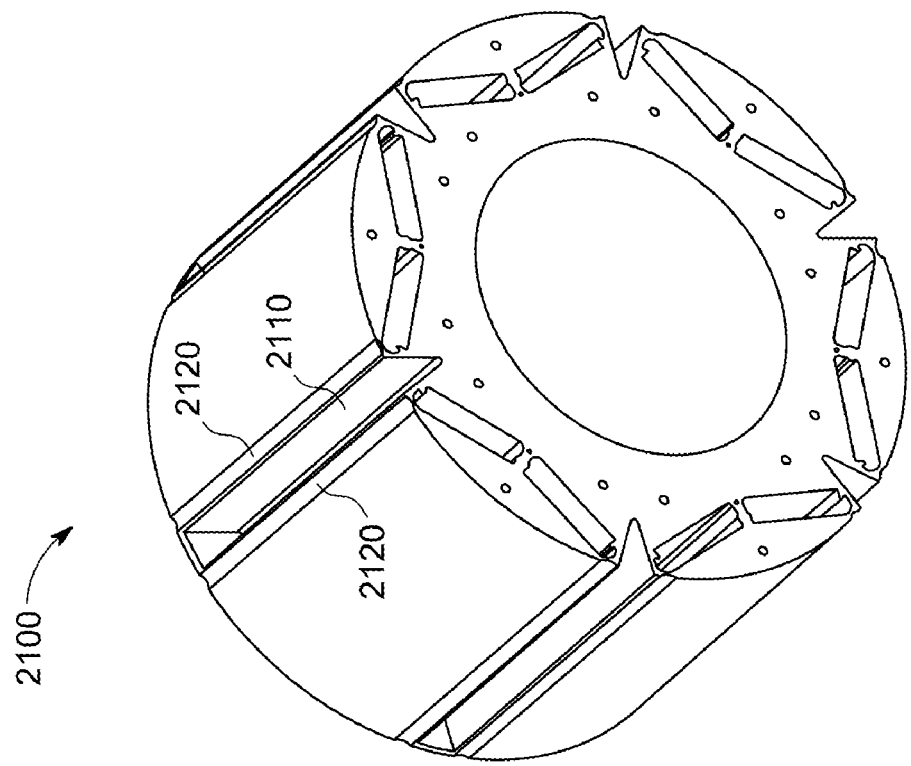
FIG. 21 illustrates a perspective view of a rotor core, according to an aspect of the present invention.

In further aspects of the present invention the rotor could comprise various configurations to improve cooling medium flow and heat transfer. FIG. 21 illustrates a perspective view of rotor 2100 having interpolar space for a cooling medium to flow down the length of the rotor. A plurality of V-shaped axial channels 2110 can be formed in the rotor 2100. Each V-shaped channel can include one or more axial grooves 2120 formed near the radially outward portion of the channel 2110.

Figure 22:
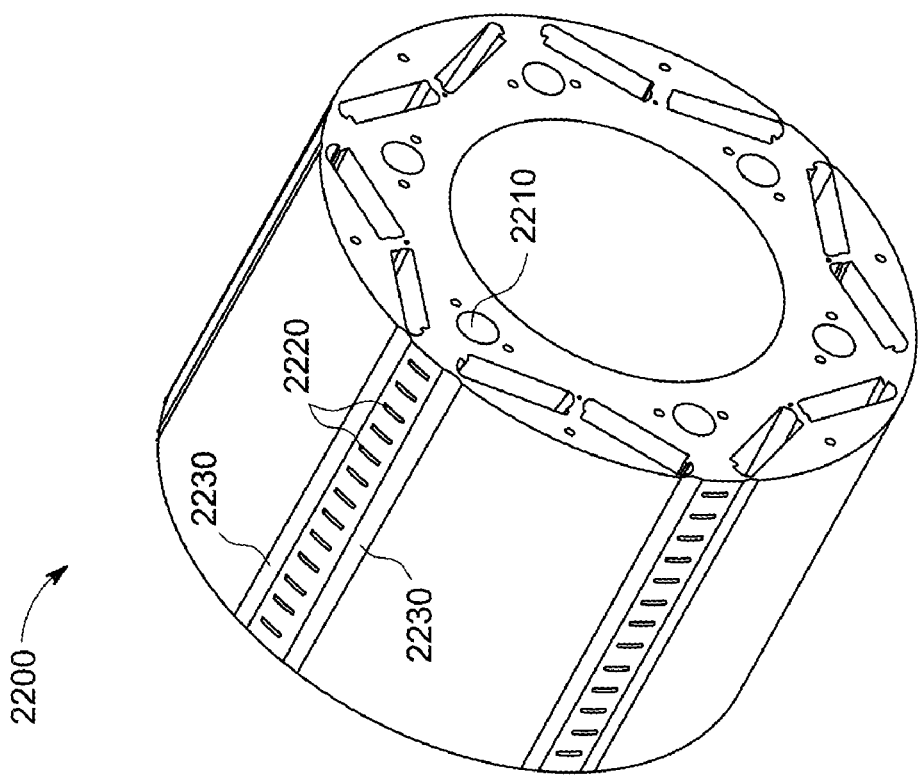
FIG. 22 illustrates a perspective view of a rotor core, according to an aspect of the present invention.

FIG. 22 illustrates a perspective view of rotor 2200 having interpolar space for a cooling medium to flow down the length of the rotor. A plurality of axial channels 2210 can be formed in the rotor 2200. Each channel 2210 can include multiple radial slots 2220 that extend from the channel radially outward, and one or more axial grooves 2230 formed near the exit of the axial grooves 2220.

Various examples of implementation have been given, and some examples show cooling passages located on the centerline between poles and on the centerline of the poles. However, it is to be understood that ventilation passages can be located off of these centerlines, as desired in the specific application. In addition, ventilation passages are shown to be generally axially or radially aligned, however, these passages could be titled or curved with respect to the axial or radial axis. The ventilation passages may also extend in a circumferential direction as well. The shape of the axial ventilation passages have been shown to be generally circular in cross-section and the radial ventilation passages have been shown to be generally rectangular in cross-section. However, both of these passages may have a variety of cross-sectional shapes (e.g., polygonal, rectangular, oval, etc.) and may also include turbulations to further enhance heat transfer. The various laminations can also be assembled in groups and combined to form a "stack" of laminations for the rotor and the stator. As one example only, a rotor or stator lamination having A, B and C type laminations may be comprised or twenty "A" type laminations, followed by thirty "B" type laminations, which are followed by twenty five "C" type laminations, and this pattern may continue until the lamination stack is complete. However, this is but one example, and any number of suitable laminations can be grouped together and stacked next to other laminations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A laminated stator for a dynamoelectric machine, comprising:
   at least one end lamination comprising a plurality of slots for stator windings;
   at least one first lamination comprising a first plurality of slots in communication with a first plurality of cooling apertures, the stator windings contained within the first plurality of slots;
   at least one second lamination comprising a second plurality of slots and a second plurality of cooling apertures in communication with the first plurality of cooling apertures, the stator windings contained within the second plurality of slots;
   wherein the at least one end lamination, the at least one first lamination and the at least one second lamination are configured together into a stator lamination stack, and the plurality of slots form a generally radial cooling passage therethrough and the first and second plurality of cooling apertures form a generally axial cooling passage therethrough for a flow of a cooling medium; and
   wherein the dynamoelectric machine further comprises a rotor, and wherein the cooling medium flows into the rotor at a first end of the dynamoelectric machine and out of the stator at a second and opposing end of the dynamoelectric machine.

2. The laminated stator of claim 1, wherein the stator windings are configured to have a space between the plurality of slots, the space allowing the cooling medium to pass by both sides of the stator windings.

3. The laminated stator of claim 1, wherein the stator windings are configured to have a space between the plurality of slots, the space allowing the cooling medium to pass by at least one side of the stator windings.

4. The laminated stator of claim 1, wherein the cooling medium flows into the rotor and out of the stator at both a first end and second end of the dynamoelectric machine.

5. The laminated stator of claim 1, wherein the cooling medium is air or hydrogen.

6. The laminated stator of claim 1, wherein the dynamoelectric machine is at least one of a generator and a motor.

7. A dynamoelectric machine comprising a rotor and a stator, the dynamoelectric machine comprising:
   at least one rotor end flange comprising a plurality of rotor axial cooling apertures;
   at least one rotor inner vent lamination comprising the plurality of rotor axial cooling apertures;
   at least one rotor outer vent lamination comprising the plurality of rotor axial cooling apertures in communication with a first plurality of rotor radially oriented ventilation slots;
   at least one stator end lamination comprising a plurality of slots for stator windings;
   at least one stator first lamination comprising a first plurality of slots in communication with a first plurality of stator cooling apertures, the stator windings contained within the first plurality of slots;
   at least one stator second lamination comprising a second plurality of slots and a second plurality of stator cooling apertures in communication with the first plurality of stator cooling apertures, the stator windings contained within the second plurality of slots;

wherein the at least one rotor end flange, the at least one rotor inner vent lamination and the at least one rotor outer vent lamination are configured together into a rotor lamination stack, and the plurality of rotor axial cooling apertures form a generally axial rotor cooling passage therethrough for a flow of a cooling medium, and the at least one stator end lamination, the at least one stator first lamination and the at least one stator second lamination are configured together into a stator lamination stack, and the plurality of slots form a generally radial cooling passage therethrough and the first and second plurality of stator cooling apertures form a generally axial stator cooling passage therethrough for a flow of the cooling medium; and wherein the cooling medium flows into the rotor at a first end of the dynamoelectric machine and out of the stator at a second and opposing end of the dynamoelectric machine.

8. The dynamoelectric machine of claim 7, the rotor further comprising:

at least one rotor center lamination comprising a plurality of apertures for windings of the rotor;

wherein the rotor center lamination substantially blocks axial flow of the cooling medium.

9. The dynamoelectric machine of claim 7, wherein the first plurality of rotor radial oriented ventilation slots are located between pole centerlines and/or at pole centerlines.

10. The dynamoelectric machine of claim 7, wherein the plurality of rotor axial cooling apertures are located between pole centerlines and/or at pole centerlines.

11. The dynamoelectric machine of claim 7, further comprising at least one fan mounted on a rotor shaft, wherein the at least one fan forces the cooling medium into the plurality of rotor axial cooling apertures.

12. The dynamoelectric machine of claim 7, wherein the dynamoelectric machine is either a single-ended ventilated machine or a double-ended ventilated machine.

13. The dynamoelectric machine of claim 7, the at least one rotor outer vent lamination further comprising:

a second plurality of rotor axial cooling apertures in communication with a second plurality of rotor radially oriented ventilated slots.

14. The dynamoelectric machine of claim 7, wherein the cooling medium is either air or hydrogen.

15. The dynamoelectric machine of claim 7, wherein the dynamoelectric machine is at least one of a generator and a motor.

16. The dynamoelectric machine of claim 7, further comprising at least one of:

a plurality of V-shaped axial channels having a plurality of axial grooves located near an outer radial position of the plurality of V-shaped axial channels; and a plurality of axial channels having a plurality of radial slots, wherein a plurality of axial grooves are located near an outer radial position of the plurality of radial slots.

17. The dynamoelectric machine of claim 7, wherein the stator windings are configured to have a space between the plurality of slots, the space allowing the cooling medium to pass by both sides of the stator windings.

18. The dynamoelectric machine of claim 7, wherein the stator windings are configured to have a space between the plurality of slots, the space allowing the cooling medium to pass by at least one side of the stator windings.

* * * * *